(No Model.) 2 Sheets—Sheet 2.
H. B. SHERIDAN & H. A. GORN.
ELECTRIC MOTOR.
No. 300,648. Patented June 17, 1884.
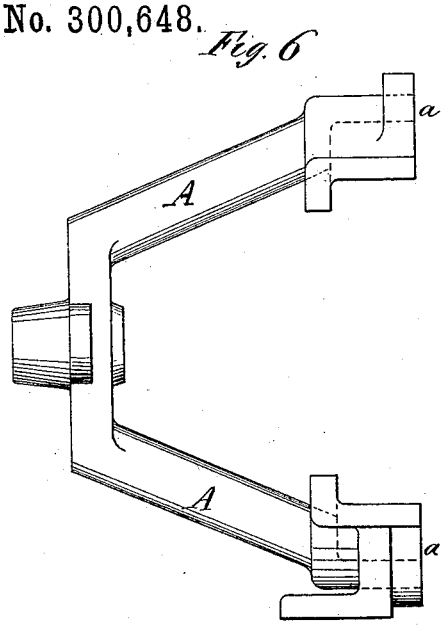
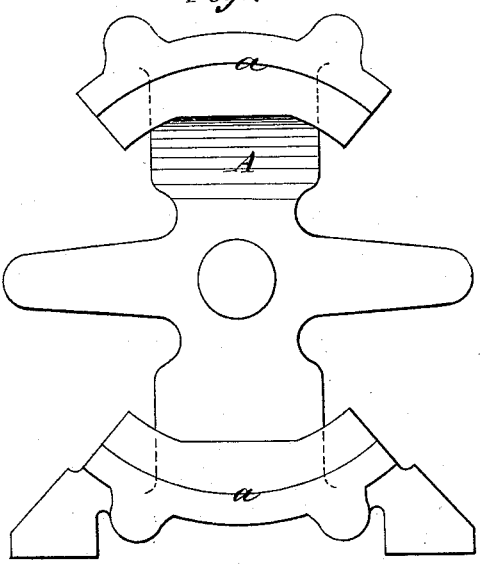
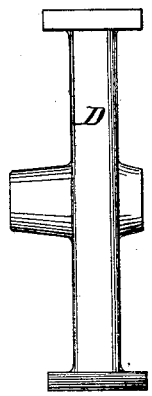
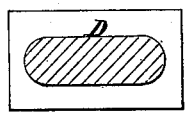
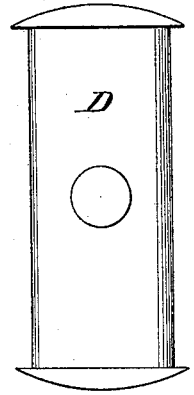
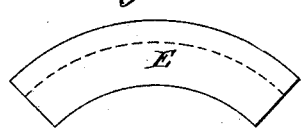
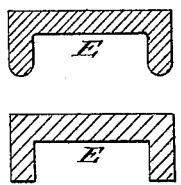
WITNESSES:
INVENTORS:
Henry B. Sheridan
Hermann A. Gorn
BY
A. W. Almqvist
ATTORNEY

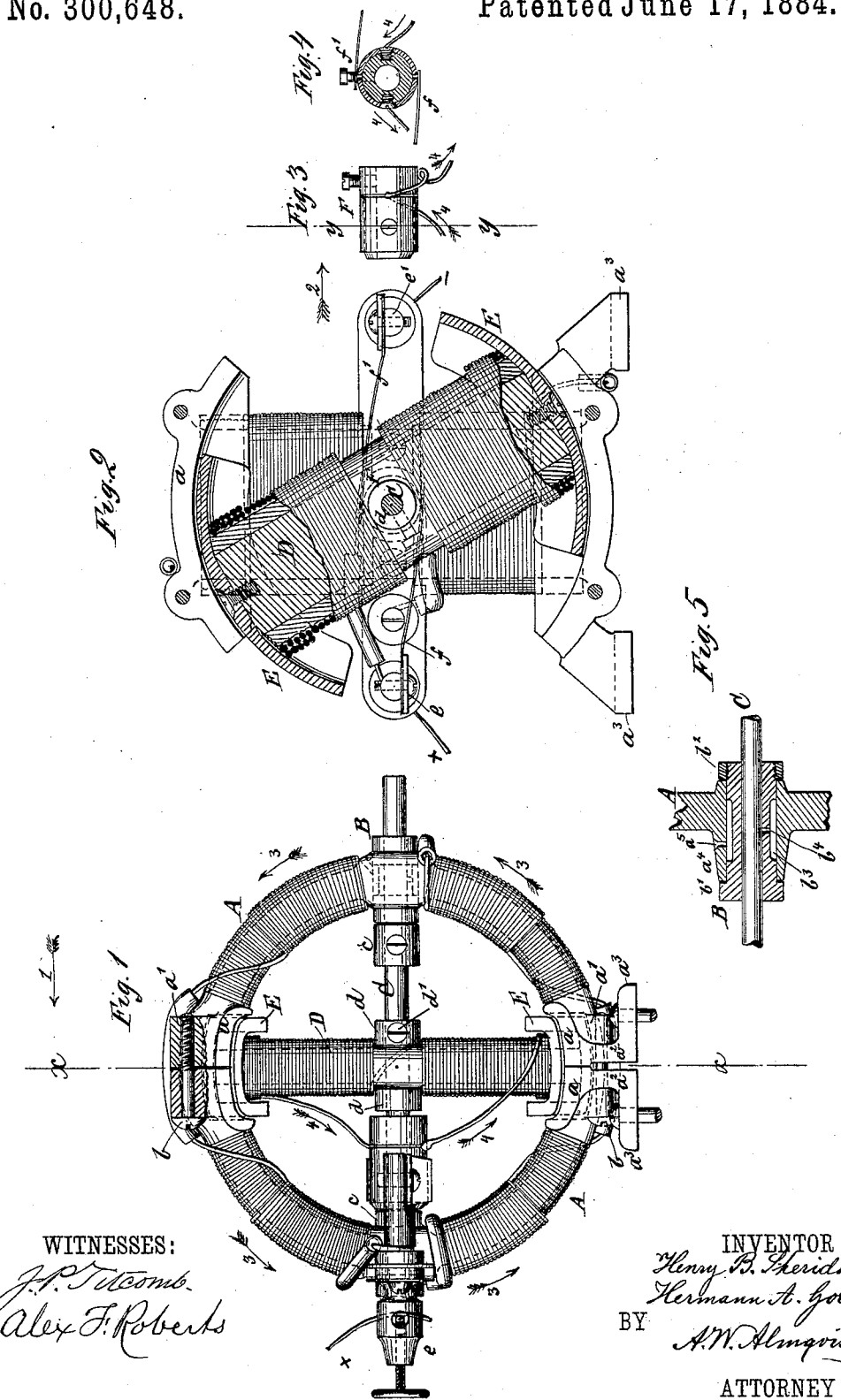

UNITED STATES PATENT OFFICE.

HENRY B. SHERIDAN, OF CLEVELAND, OHIO, AND HERMANN A. GORN, OF NEW YORK, N. Y.

ELECTRIC MOTOR.

SPECIFICATION forming part of Letters Patent No. 300,648, dated June 17, 1884.

Application filed September 5, 1883. (No model.)

*To all whom it may concern:*

Be it known that we, HENRY B. SHERIDAN and HERMANN A. GORN, citizens of Great Britain and of the United States, respectively, and residents of Cleveland, Ohio, and of New York, N. Y., respectively, have invented certain new and useful Improvements in Electric Motors, of which the following is a specification.

Our invention relates to electric motors or electro-magnetic engines, more especially for furnishing light power, such as is needed for operating dental tools, sewing-machines, and the like.

The object of our invention is to provide an improved construction of electric motors whereby a greater amount of power will be obtained with less velocity than in similar machines as heretofore constructed.

The invention comprises the construction of the magnet and armature, whereby the latter is made to revolve in a plane at right angles to that of the magnet, the active area of the magnetic field is increased, and the machine is cheaply made and conveniently put together, and adapted to be secured to any suitable table, bed-plate, frame, or other support, as will be hereinafter described and claimed, reference being had to the accompanying two sheets of drawings, in which—

Figure 1 represents a front elevation of our improved electric motor. Fig. 2 is an elevation of the same divided on the line $x\,x$ of Fig. 1, and seen in the direction of arrow 1, the armature and shoes being partly broken out to better show the construction. Fig. 3 is a side view of the commutator; and Fig. 4, a cross-section of the same on the line $y\,y$ of Fig. 3, seen in the direction of arrow 2. Fig. 5 is a vertical section of one of the bearings of the armature-shaft. Figs. 6 and 7 are side and front views, respectively, of one of the magnet-cores. Figs. 8 and 9 are front and side views, respectively, of the core of the armature, and Fig. 10 a cross-section of the same. Figs. 11 and 12 are a side view and cross-sections, respectively, of the armature-shoe or pole-piece.

The frame of the machine is a circular or annular electro-magnet formed of two semi-annular magnets, A, provided at the poles with curved and concave cross-heads $a$, arranged transversely to the central plane of the magnets A, and the said cross-heads are provided with suitable lugs, $a'$, by which and by bolts or screws $b$ the two magnets are secured together at their poles. When thus put together the two poles of the entire circular magnet will be situated diametrically opposite in the line $x\,x$. At one of the poles of this compound magnet the cross-heads $a$ are provided with vertical flanges $a^2$, having horizontal flanges or lugs $a^3$, by which latter the frame may be bolted to its bed-plate or other support.

Centrally transverse to the polar diameter is arranged and mounted in bearings B, through the magnets A, the armature-shaft C. For this purpose the magnets are preferably provided with hubs $a^4$, which are bored through, and the bearing is fitted tightly in the said bore, and is provided at one end with a flange, $b'$, serving as a stop against the hub, while the other end, projecting a short distance beyond the hub, is threaded to receive a nut, $b^2$, by tightening which latter against the end of the hub the bearing B is secured firmly in place. A portion of the bearing B is reduced in size upon its circumference, so as to form an annular lubricating-chamber, $b^3$, into which oil is poured through a hole, $a^5$, in the hub above the bearing, and reaches the shaft C through a hole, $b^4$, through the bearing underneath the shaft; but the construction of the bearing B we reserve for a separate patent application.

The core D of the armature is an oval or flat bar provided with central hubs, $d$, through which it is bored and fitted upon the shaft C, being secured thereon by a set-screw, $d'$, or in some other suitable manner. The insulated wire or helix is wound around the said core, crosswise thereto, as shown in Figs. 1 and 2, (not lengthwise, as heretofore,) and the longer axis of the cross-section is at right angles to the shaft C, and thus also at right angles to the axis of revolution.

The cross-heads or poles $a$ of the annular magnet are curved and concaved on an arch having the axis of the shaft C for its center, and on the same center, with a slightly shorter radius, are curved the shoes E, which are secured one to each of the two opposite ends of the core D. Reference to Figs. 2 and 7 will show that the chord of the arched cross-heads $a$ is considerably longer than the width of the magnet A, and may be still further increased, thereby also increasing the effective area of the magnetic field represented by the curved and hollow surface of the united cross-heads at either pole. The shoes E are of size and form corresponding to that of the cross-heads $a$, which constitute the poles of the electro-magnet, both being preferably U-shaped or double-angled in cross-section, and the sides of the U or double angle being also arranged to cover the helix, as shown. Each magnet A is cast in one piece with its cross-heads or magnetic poles, and lugs, and flanges $a\ a'\ a^2\ a^3$, and is surrounded with its ordinary insulated-wire coil, as shown in the drawings. The shaft C is kept from lateral displacement by set-screws and collars in the ordinary manner. The electric current enters at the binding-post $e$, thence through the entire electric coil, as indicated by the arrows 3, thence to and through the brush $f$, to one side of the commutator F, (held by set-screw on shaft C,) thence through the armature-helix, as indicated by the arrows 4, to the other side of the commutator, and finally from there and through the other brush, $f'$, to the binding-post $e'$ and to the battery. It will be seen that by this construction the armature is made to revolve in a plane at right angles to the plane of the annular magnet and not in the same plane, (as in machines as heretofore constructed,) and thus has the great advantage that the magnetic lines of the armature during its revolution cross or intersect the magnetic lines of the cross-heads or poles $a$, (instead of moving parallel with the same, as in electromotors as heretofore constructed,) thereby greatly increasing the power of the machine and making it possible to produce an increased effect, even when running it at a much less speed than others.

The shape of the semi-annular magnets or cores A may be made quite semicircular, as in Fig. 1; but we preferably cast them in that angularly-semi-annular shape shown in Figs. 6 and 7, this being not only more convenient for facilitating the manual labor in making the machines and attaching wires and posts, &c., thereto, but also causing the helices or coils wound upon the said cores to be at a little greater distance from the helix of the armature than when the entirely circular form is used.

Having thus described our invention, we claim as new and desire to secure by Letters Patent—

1. The stationary magnet formed of two magnets, A, which are joined together at their poles by curved cross-heads $a$, and provided at one of the said poles with lugs and fastening devices $a^2\ a^3$, in combination with an armature revolving in a plane at right angles to that of the said magnet.

2. In combination with the magnet A A, the armature consisting of the bar D, wound crosswise, and mounted with its longer axis of cross-section at right angles to its axis of rotation, and the shoes E, secured to the ends of the said bar, the said armature being arranged to revolve in a plane at right angles to that of the said magnet, substantially as and for the purpose set forth.

3. The curved shoes E, U-shaped in cross-section, substantially as shown, in combination with the magnet A A, composed of united magnets, and having at its poles curved and concave cross-heads $a\ a$, and with the armature-core D, arranged to revolve in a plane at right angles to that of the said magnet, substantially as specified.

In testimony that we claim the foregoing as our invention we have signed our names, in presence of two witnesses, this 3d day of September, 1883.

HENRY B. SHERIDAN.
HERMANN A. GORN.

Witnesses:
A. W. ALMQVIST,
R. W. STREHLENERT.